United States Patent
Blackmon et al.

[11] Patent Number: 5,839,463
[45] Date of Patent: Nov. 24, 1998

[54] VALVE ASSEMBLY FOR FLUID TRANSFER SYSTEM

[75] Inventors: James B. Blackmon, Brownsboro, Ala.; Nelson E. Jones, Los Osos, Calif.

[73] Assignee: McDonnell Douglas Corporation, Huntington Beach, Calif.

[21] Appl. No.: 883,969

[22] Filed: Jun. 27, 1997

[51] Int. Cl.⁶ .................................................. E03B 1/00
[52] U.S. Cl. .................. 137/1; 137/625.46; 137/625.11; 251/230; 60/259
[58] Field of Search ............... 137/629.11, 625.46, 137/1, 209; 251/230, 58, 129.2; 60/257, 259

[56] References Cited

U.S. PATENT DOCUMENTS

| | | | |
|---|---|---|---|
| 350,675 | 10/1886 | Hathaway | 137/625.46 |
| 825,370 | 7/1906 | Zurbuch | 137/625.11 |
| 1,136,589 | 4/1915 | Davis | 137/625.46 |
| 2,488,283 | 11/1949 | Franck | 137/625.11 |
| 2,523,521 | 9/1950 | Ritter | 60/97 |
| 2,601,607 | 6/1952 | Halford et al. | 60/259 |
| 2,918,938 | 12/1959 | Kimball | 137/625.1 |
| 2,947,318 | 8/1960 | Odom | 137/122 |
| 3,124,162 | 3/1964 | Cameron | 137/625.46 |
| 3,134,389 | 5/1964 | Arline et al. | 60/259 |
| 3,217,749 | 11/1965 | Greenwald | 137/625.1 |
| 3,306,038 | 2/1967 | Ferriman | 60/259 |
| 3,344,809 | 10/1967 | Smith | 137/625.11 |
| 3,422,848 | 1/1969 | Liebman et al. | 137/625.46 |
| 3,494,175 | 2/1970 | Cusick et al. | 73/37 |
| 3,590,872 | 7/1971 | Baity | 137/625.46 |
| 4,156,437 | 5/1979 | Chivens et al. | 137/554 |
| 4,178,963 | 12/1979 | Riefler et al. | 137/624.1 |
| 4,632,148 | 12/1986 | Stark, Sr. et al. | 137/624.1 |
| 4,705,627 | 11/1987 | Miwa et al. | 210/264 |
| 5,261,451 | 11/1993 | Spencer | 137/554 |
| 5,277,144 | 1/1994 | Moody | 114/319 |

FOREIGN PATENT DOCUMENTS

| | | | |
|---|---|---|---|
| 44-22340 | 9/1969 | Japan | 137/625.11 |

*Primary Examiner*—Denise L. Ferensic
*Assistant Examiner*—John Ball
*Attorney, Agent, or Firm*—Senniger, Powers, Leavitt & Roedel

[57] ABSTRACT

A valve assembly for transferring fluid from a fluid supply tank to a fluid holding tank. The valve assembly includes a housing having a first port for communication with the fluid supply tank and a second port for communication with the fluid holding tank. A drum is rotatably mounted in the housing and has a passageway therein. The passageway has an opening located at each end thereof positioned on an outer surface of the drum for alignment with one of the ports in the housing. The drum is rotatable between a flow position in which the openings are aligned with the ports to permit fluid flow from the fluid supply tank to the fluid holding tank and a shut-off position in which one of the openings is not aligned with the ports to prevent flow from the supply tank to the holding tank. The valve assembly further comprises an actuator for rotating the drum within the housing between the fluid flow and shut-off positions. The housing is sealingly engageable with the fluid supply tank around a periphery of an aperture in the tank for sealingly closing the aperture in the tank.

19 Claims, 6 Drawing Sheets

VALVE ASSEMBLY FOR FLUID TRANSFER SYSTEM

BACKGROUND OF THE INVENTION

This invention relates generally to valve assemblies and, more particularly, a rotary valve assembly for use in a fluid transfer system.

Fuel systems such as used in aircraft, missiles, ships, or automobiles, for example, typically include a number of fluid control valves and associated tubing and electronic controllers for venting, filling, and pressurizing a fuel tank and providing both fuel and an oxidizer to an engine. This complex system of multiple valves, tubing, electronic controllers, and wiring significantly increases the weight of the fuel system and the space required for installation of the fuel system. In addition, the high number of leakage points associated with the valves and tubing and the electrical control system required for positioning and monitoring multiple valves reduce the overall reliability of the system and increase the maintenance time required to repair the system, thus increasing the downtime of the vehicle and cost of the system.

Furthermore, large volume fuel tanks, such as required for missiles and aircraft, include a tank closure having a large diameter to provide easy access to the fuel tank for repair or replacement of hardware located within the tank or maintenance or inspection within the tank. The tank closure further increases the weight of the system and reduces the reliability by providing another potential leakage point in the system.

SUMMARY OF THE INVENTION

The present invention overcomes the deficiencies of the prior art by providing a valve assembly which integrates the functions of multiple control valves for transferring fluid from a supply tank to one or more holding tanks, venting, filling and pressurizing the fluid in the holding tanks and supplying fluid from the holding tanks to an engine. The integrated valve assembly eliminates the need for multiple valves and the associated tubing and controllers. The present invention includes the provision of a valve which is uniquely constructed and arranged to permit single valve control of a fluid transfer system, thus providing a lightweight and compact system. The valve is operable to seal an aperture in the fluid supply tank when the system is in use and is removable from the aperture to provide access to the tank when the system is not in use, therefore eliminating the need for a separate tank closure and further reducing the weight of the system. The valve assembly overcomes the limitations of the prior art devices and provides a lightweight and reliable valve assembly and fluid transfer system by reducing the number of components in the system and simplifying the construction of the system.

Generally, a valve assembly of this invention is for use in transferring fluid from a fluid supply tank having an aperture formed therein, to a fluid holding tank. The valve assembly comprises a housing having a first port for communication with the fluid holding tank and a drum rotatably mounted in the housing and having at least one passageway formed therein. The passageway has an opening located at each end thereof positioned on an outer surface of the drum for alignment with one of the ports in the housing. The drum is rotatable between a flow position in which the openings are aligned with the ports to permit fluid to flow from the fluid supply tank to the fluid holding tank and a shut-off position in which at least one of the openings is not aligned with the ports to prevent flow from the supply tank to the holding tank. The valve assembly further comprises an actuator for rotating the drum within the housing between the fluid flow and shut-off positions. The housing is sealingly engageable with the fluid supply tank around a periphery of the aperture in the tank for sealingly closing the aperture in the tank.

In another aspect of the invention, a fuel transfer system generally comprises a fuel supply tank, a fuel holding tank, an engine and a valve assembly for controlling fluid communication between the fluid supply tank and the fuel holding tank, and between the holding tank and the engine. The valve assembly comprises a housing having a first port in communication with the fuel supply tank, a second port in communication with the fuel holding tank and a third port in communication with the engine. A drum is rotatably mounted in the housing and includes a first passageway having a first opening at one end thereof adapted to mate with the first port in the housing, and a second opening at the other end thereof adapted to mate with the second port in the housing. A second passageway extends from the second opening to a third opening adapted to mate with the third port in the housing. The drum is rotatable about a longitudinal axis for selective alignment of the openings with the ports according to the relative angular position of the drum. The valve further comprises an actuator for rotating the drum within the housing to specific angular positions. The drum is rotatable between a filling position in which the first port is aligned with the first opening and the second port is aligned with the second opening for transferring fuel from the fuel supply tank to the fuel holding tank, and a fuel delivery position in which the second opening is aligned with the second port and the third opening is aligned with the third port for transferring fuel from the fuel holding tank to the engine.

A method of the present invention is generally for transferring fuel from a fuel supply tank to an engine through a valve assembly as described above. The method comprises the steps of rotating the drum to a filling position wherein the fuel supply tank is in fluid communication with a fuel holding tank to permit flow from the supply tank to the holding tank and rotating the drum to a delivery position wherein the fuel holding tank is in fluid communication with the engine to permit flow from the holding tank to the engine.

Other objects and features will be in part apparent and in part pointed out hereinafter.

DESCRIPTION OF THE PREFERRED EMBODIMENTS

Figure 1:
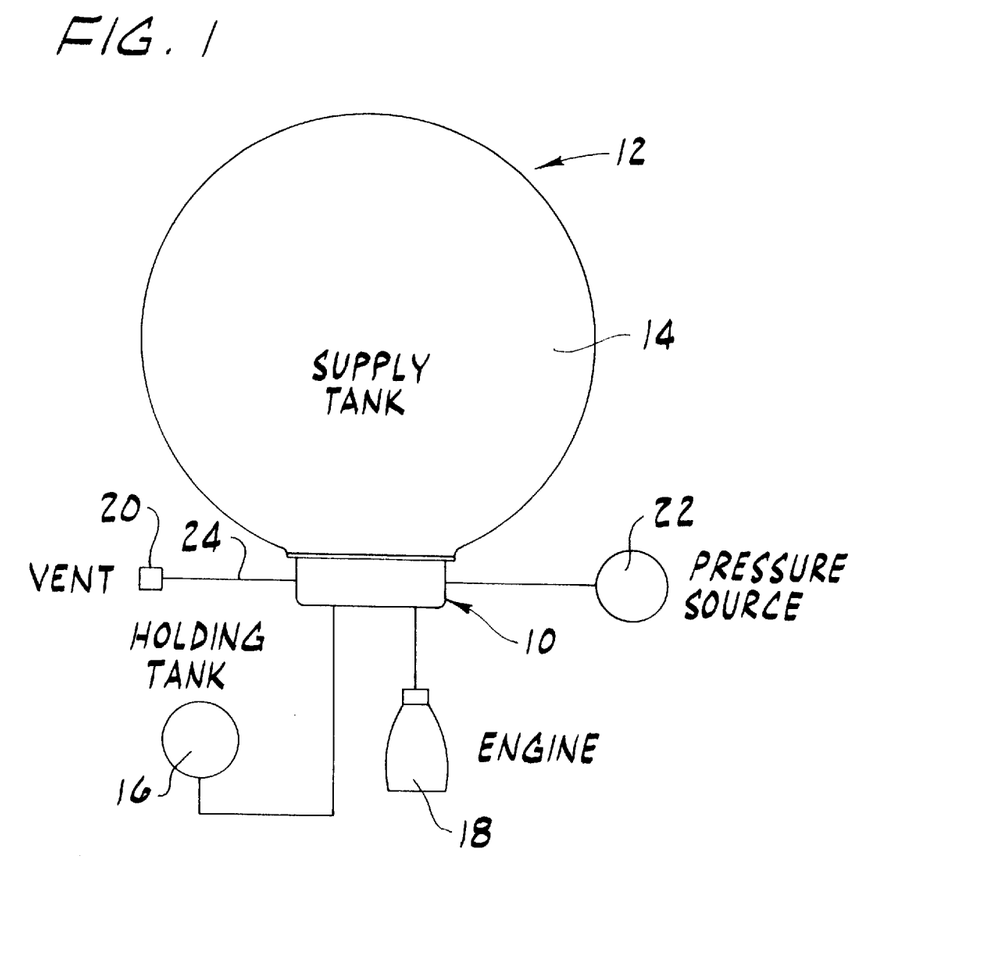
FIG. 1 is a schematic of a fluid transfer system of the present invention.
Figure 2:
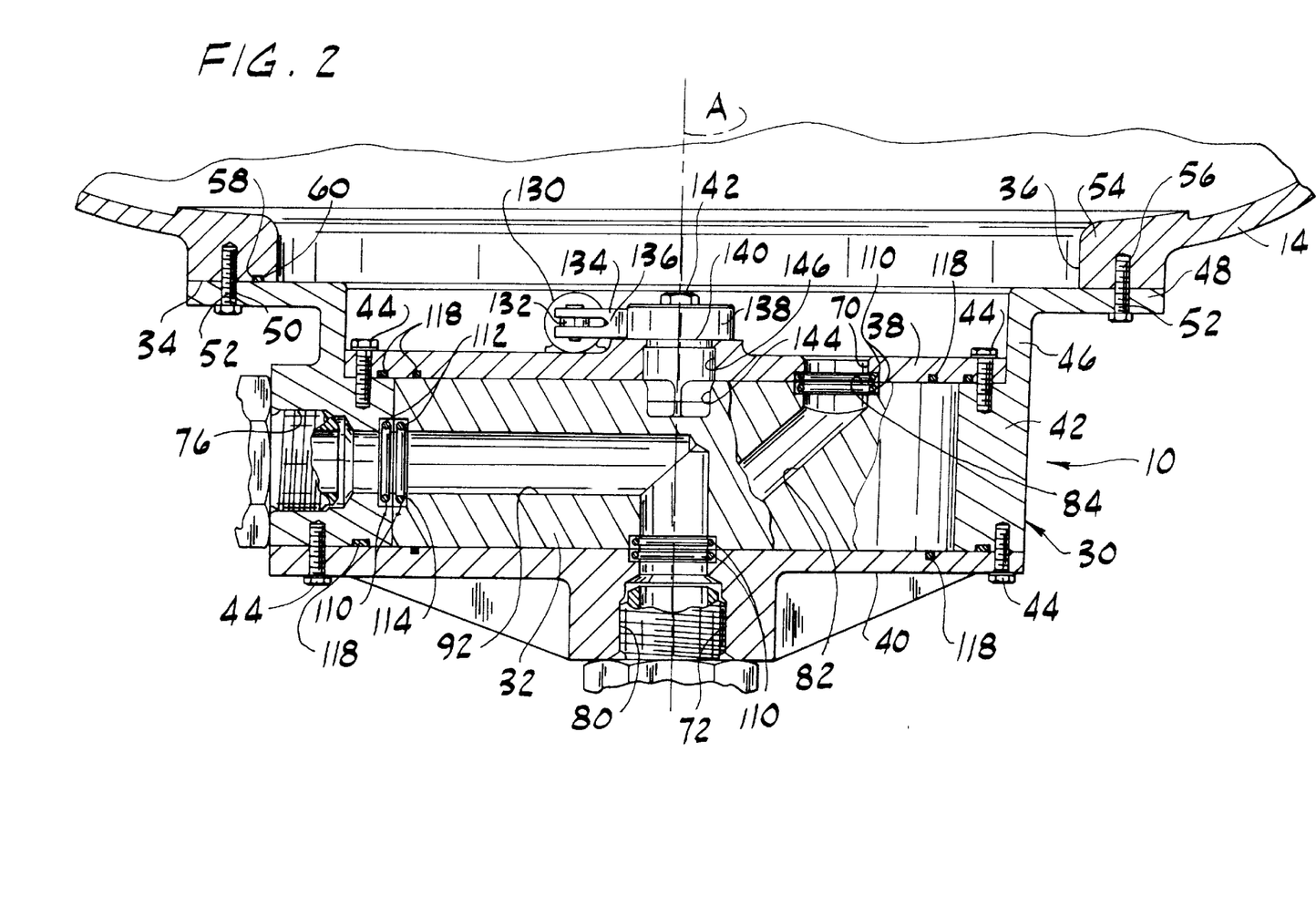
FIG. 2 is a cross-sectional view of a valve assembly of the fluid transfer system of the present invention.

Referring now to the drawings, and first to FIGS. 1 and 2, a valve assembly of the present invention is generally indicated at 10. The valve assembly 10 is for use in a fluid transfer system such as a fuel system of the type shown in FIG. 1 and generally indicated at 12. The fuel system 12 may be used on a missile, spacecraft, ship, automobile, or other vehicle, for example, and may also be used to transfer fuel between tanks for weight or center of gravity control. The system 12 may be used to transfer liquids other than fuel or to transfer gases and may be used as either a mobile or stationary fluid transfer system. As shown in FIG. 1, the fluid transfer 12 system includes a fluid supply tank 14 for storing a large volume of fluid, a fluid holding tank 16 for temporarily storing the fluid, and a fluid receiving device such as an engine 18. The holding tank 16 may be required for microgravity conditions in space. The holding tank 16 may also be used with relatively small fluid supply tanks which supply propellant to the engine 18 under relatively high pressure which would result in a lower weight than if a large main supply tank were designed to operate at high pressure. The valve 10 controls fluid communication between the fluid supply tank 14 and the fluid holding tank 16, and between the fluid holding tank and the engine 18. The valve 10 also provides fluid communication between the holding tank 16 and a vent 20 for venting air or other pressurant trapped within the holding tank 16 and between the holding tank and a pressure source 22 for pressurizing the fluid within the holding tank.

Figure 3:
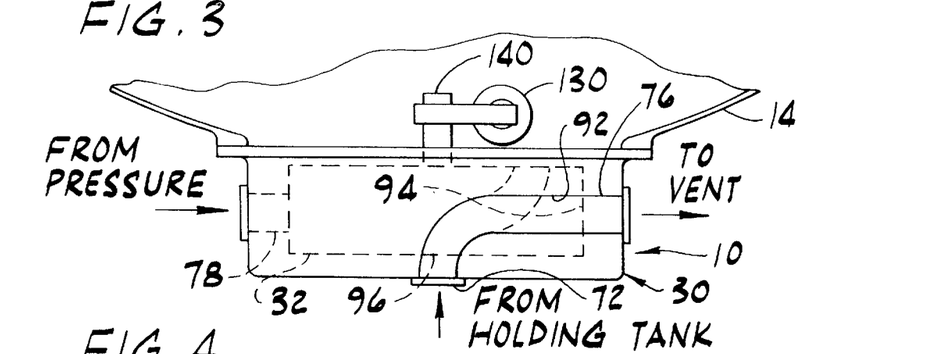
FIG. 3 is a schematic of the valve assembly of FIG. 2 in a venting position.
Figure 4:
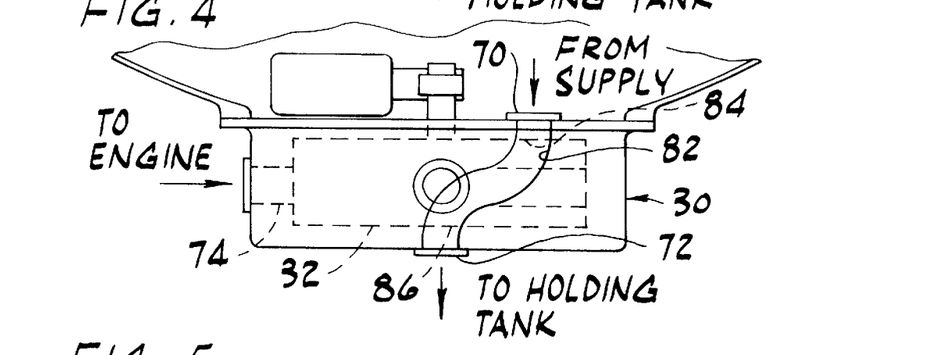
FIG. 4 is a schematic of the valve assembly of FIG. 2 in a filling position.
Figure 5:
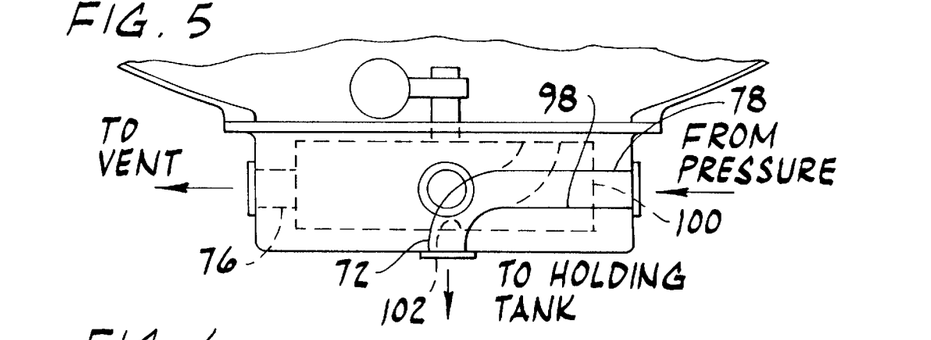
FIG. 5 is a schematic of the valve assembly of FIG. 2 in a pressurizing position.

The valve 10 is movable between four positions shown schematically and sequentially in FIGS. 3–6 and with reference to the valve shown in the system of FIG. 1. FIG. 3 shows the valve 10 in a venting position in which the fluid holding tank 16 is in communication with a vent line 24 for venting either fluid or air from the tank. The vent line 24 is preferably connected to a container for receiving any fluid vented from the holding tank 16, but may also be open to atmosphere for venting air or other gasses trapped in the tank. A valve filling (flow) position (FIG. 4) allows fluid from the supply tank 14 to flow into the holding tank 16 until the tank is filled to a predetermined level. An electrical sensor such as an optical sensor, capacitance sensor, or a magnetic float (not shown) may be used to sense the fluid level in the tank 16. When the holding tank 16 is full, the valve 10 is moved to a pressurizing position (FIG. 5). The pressure source 22 may be a high pressure bottle, compressor, accumulator, pressurizing gas supply, or any other pressure generating unit. After the pressure, fluid level, or mass of fluid in the holding tank 16 reaches a predetermined level, as detected by a pressure switch, level sensor, mass sensor, (not shown) or other suitable device, the valve 10 is switched to either a shut-off position or a fluid delivery position (FIG. 6) and the pressurized fluid is transferred from the holding tank 16 to the engine 18.

This cycle may be repeated continuously in the same sequence or different sequences. The valve 10 is preferably moved to a shut-off position in between each of the above four flow positions to allow the system 12 to stabilize prior to moving the valve to its next position. It is to be understood that the number of shut-off and flow positions and the sequence of the positions may be different than described above without departing from the scope of the invention.

Referring again to FIG. 2, the valve assembly 10 comprises a housing, generally indicated at 30, and a drum 32 rotatably mounted in the housing. As will be described, the housing 30 is preferably sealingly engageable with the fluid supply tank 14 around a periphery 34 of an aperture 36 in the tank for sealingly closing the opening in the tank.

The housing 30 includes opposing end walls 38, 40 and a side wall 42 connecting the end walls. The end walls 38, 40 are formed separately from the side wall 42 and attached to the side wall by screws 44 or other appropriate fasteners. One of the end walls 38, 40 may also be integrally formed with the side wall 42. The side wall 42 has a cylindrical portion 46 extending beyond end wall 38 and a flange 48 extending radially outward from the cylindrical portion. The flange 48 has a plurality of circumferentially spaced openings 50 for receiving fasteners 52 (e.g., screws, rivets) for attaching the housing to a rim 54 on the supply tank 14 around the periphery 34 of the opening. The rim 54 includes a plurality of openings 56 for receiving the screws. An O-ring 58 disposed in a groove 60 extending around the rim 54 prevents leakage of fluid from between the mating surfaces of the rim and the flange 48.

It is to be understood that the rim 54 of the supply tank 14, the flange 48 of the housing 30 and the sealing interface between the supply tank and housing may have configurations other than the one shown without departing from the scope of this invention. For example, the flange 48 may extend radially outward from the cylindrical portion 46 at a location between the end walls 38, 40. The valve 10 may also be mounted remotely from the supply tank 14 with a line extending from the supply tank to the valve for fluid communication between the supply tank and the valve.

The housing 30 is preferably made from high strength low weight metal such as aluminum, stainless steel, or titanium. For low pressure applications, portions of the housing 30 may be formed from polymer materials or composites. The end walls 38, 40 and the exterior of the housing may also be rectangular or have other shapes to correspond to the opening in the supply tank 14 or fit within tight installation areas.

A first port 70 (supply port) is formed in the end wall 38 located within the fluid supply tank 14 for direct communication with the tank. The opposite end wall 40 includes a second port 72 (holding tank port) in communication with the fluid holding tank 16. The side wall 42 includes third 74 (engine), fourth 76 (vent) and fifth 78 (pressure) ports for communication with the engine 18, vent 20 and pressure source 22, respectively (FIGS. 2–6). The first port 70 consists of an opening in the end wall 38. Each remaining port 72, 74, 76, 78 includes a press-in or threaded connector 80 having either internal or external threads for mating with a threaded fitting located at one end of a fluid line. Other types of fittings or connectors may also be used to connect the ports with the fluid lines.

Figure 6:
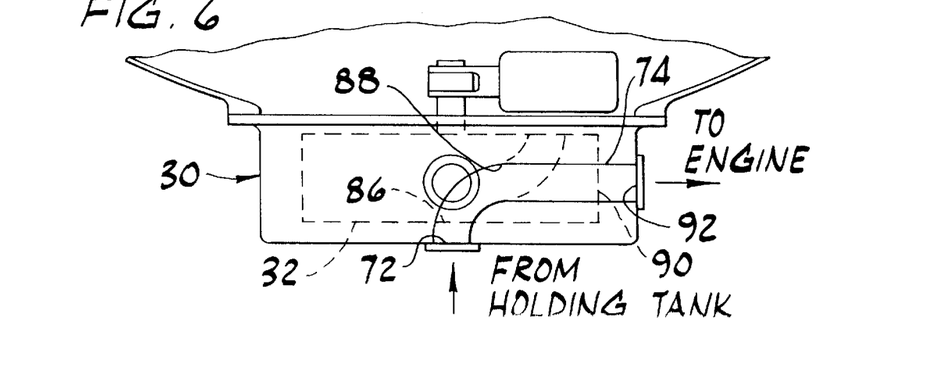
FIG. 6 is a schematic of the valve assembly of FIG. 2 in a fluid delivery position.
Figure 7:
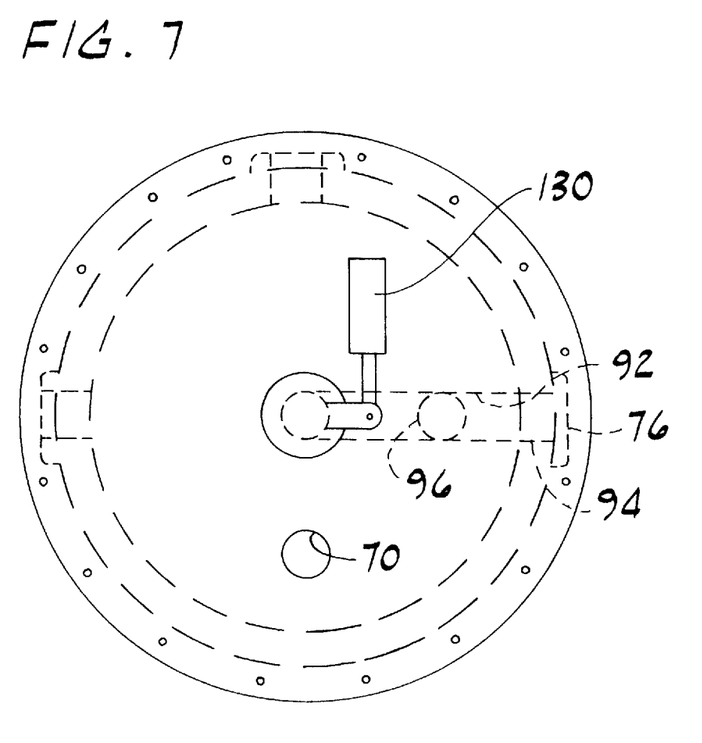
FIG. 7 is a schematic top plan view of the valve assembly in the position shown in FIG. 3.

The drum 32 is rotatable about a longitudinal axis A for selective alignment of openings formed in the drum with the ports 70, 72, 74, 76, 78 in the housing 30 according to the relative angular position of the drum. The drum 32 includes a first passageway 82 having a first opening 84 at one end thereof adapted to mate with the supply port 70 in the housing 30 and a second opening 86 at the other end thereof adapted to mate with the holding tank port 72 in the housing, for transferring fluid from the supply tank 14 to the holding tank 16 (FIG. 4). A second passageway 88 extends from the second opening 86 in the drum 32 to a third opening 90 adapted to mate with the engine port 74 in the housing 30 for transferring fluid from the holding tank 16 to the engine 18 (FIG. 6). A third passageway 92 extending through the drum 32 has one end 94 positioned on an outer surface of the drum for alignment with the vent port 76 and its other end 96 located for alignment with the holding tank port 72 (FIGS. 3 and 7). A fourth passageway 98 formed in the drum 32 has one end 100 positioned on an outer surface of the drum for alignment with the pressure port 78 and its other end 102 positioned for alignment with the holding tank 72 port, thus providing fluid communication between the holding tank 16 and the pressure source 22 (FIG. 5).

It is to be understood that the location of the ports and openings on the valve and the number of ports, openings and passageways may vary without departing from the scope of this invention. For example, the vent and pressure ports 76, 78 may be located on the end wall 40 rather than the side wall 42.

The drum 32 is preferably cylindrical, but may have other shapes as described below. The drum 32 is made from metal or other suitable material which is compatible with the housing 30. The diameter of the drum 32 of the eight position valve shown is preferably greater than 6.0 inches (15.24 cm), to provide adequate spacing between adjacent openings. It is to be understood that the shape and size of the drum 32 and the number of positions of the valve may vary without departing from the scope of this invention.

As shown in FIG. 2, the housing 30 and drum 32 include seals 110, 118 for preventing leakage between the housing and the drum and adjacent ports in the housing and openings in the drum. Seals 110 located at the interface between the side wall of the housing 30 and the drum 32 are preferably dual unvented seals. The seals 110 located at the interface between the end walls 38, 40 and the drum 32 may be either single or dual seal configurations. The seals 110 each comprise an O-ring 112 and a plastic cap 114 located adjacent the outer diameter of the O-ring. Face seals 118 disposed on the flat surfaces of the housing 30 and drum 32 are preferably spring loaded for preventing leakage and providing increased reliability. Other seal configurations may be used to meet specific pressure and fluid requirements.

Figure 8:
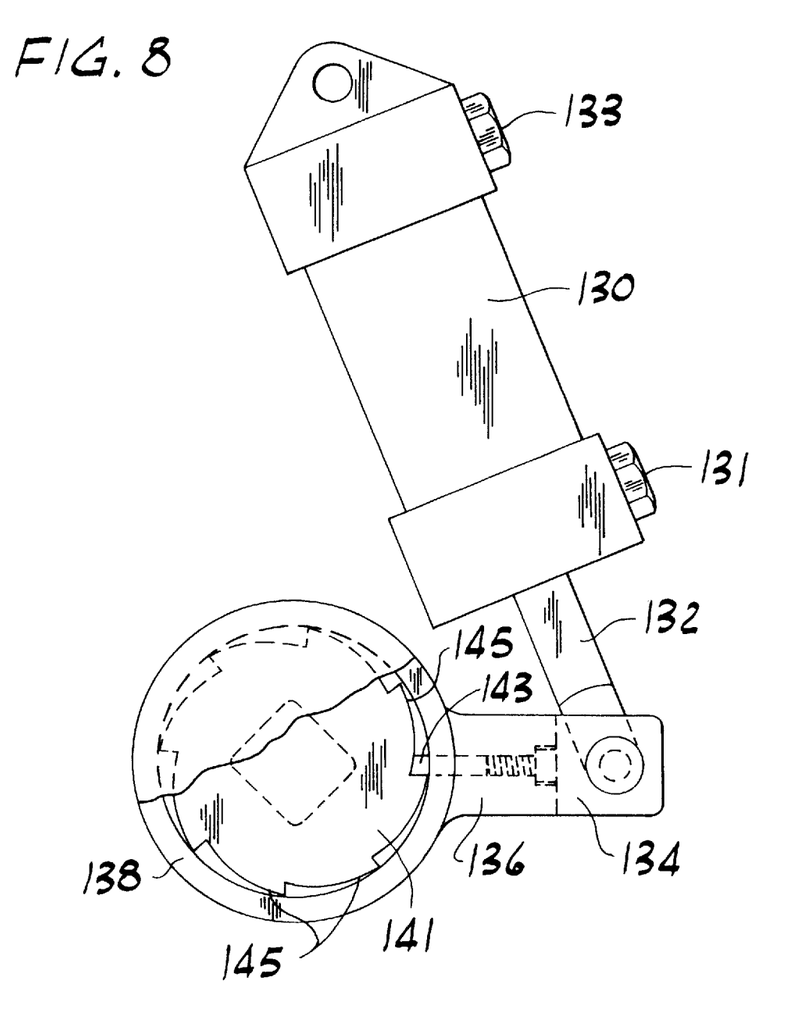
FIG. 8 is a top plan view of an actuator and crank arm of the valve assembly of FIG. 2.

An actuator 130 is mounted on end wall 38 within the fluid supply tank 14 for rotating the drum 32. The actuator 130 may also be mounted on end wall 40 or at any other location external to the fluid supply tank 14. As shown in FIGS. 2 and 8, the actuator 130 is a linear actuator having retract and extend ports 131, 133, and a piston rod end 132 attached to a yoke 134 at one end of a crank arm 136. The opposite end of the crank arm 136 includes a ring 138 mounted on a shaft 140 which is fixedly connected to the drum 32 for rotating the drum about the longitudinal axis A. The interface between the crank arm 136 and shaft 140 is preferably a ratchet and pawl gear tooth arrangement so that the linear actuator can drive the drum 32 through 360 degrees of rotation. The shaft 140 includes a ratchet wheel 141 at its upper end. A spring loaded pawl pin 143 attached to the crank arm 136 is engageable with teeth 145 on the ratchet wheel 141. The ratchet wheel 141 includes eight teeth 145 for positioning the drum 32 in the four positions shown in FIGS. 3–6 and four shut-off positions. The ratchet and pawl arrangement releasably holds the drum 32 at specific angular positions and ensures proper alignment between the openings and the ports when the drum is in one of its eight positions. Other types of detent or ratchet type assemblies may also be used. For example, an adjustable stop (not shown) may be included at the end of the yoke 134 to align the ports and openings.

The shaft 140 is attached to the ring 138 by a fastener 142 and may be press fit into an opening 144 in the drum 32 or held in place by a retaining ring, for example. The end wall 38 includes an opening 146 for receiving the shaft. The actuator 130 may be driven by hydraulic, pneumatic or electrical power and may also be a rotary actuator such as a motor or vane actuator. The actuator 130 is preferably controlled by an electronic controller which provides electrical commands to a solenoid operated pilot valve or an electrohydraulic valve (not shown), for example, which may be integrally mounted on the actuator or remotely mounted external to the supply tank 14. A position indicator such as a rotary variable differential transducer may be used to monitor the angular position of the drum 32 and provide closed loop feedback to the electronic controller. The actuator 130 may also be mechanically driven by linkages or manually actuated.

Figure 9:
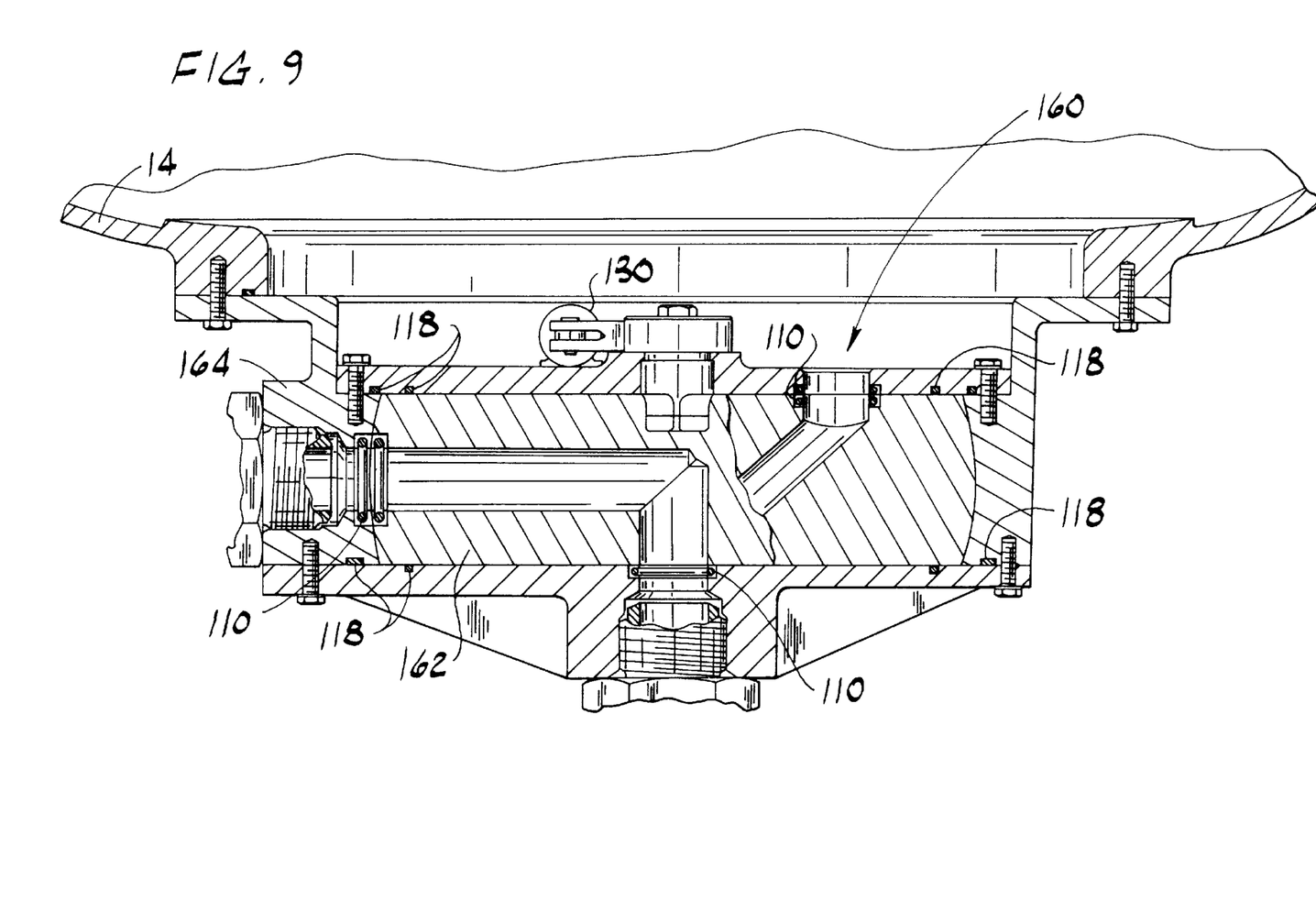
FIG. 9 is a cross-sectional view of a valve assembly of a second embodiment of the present invention.

A second embodiment of the valve assembly is shown in FIG. 9 and generally indicated at 160. The valve 160 is similar to the valve 10 described above except that the drum 162 is part spherical in shape. This configuration provides improved sealing between the drum 162 and housing 164 and reduces manufacturing costs.

It will be observed from the foregoing that the fluid transfer system of the present invention has numerous advantages. Importantly, the single valve design eliminates the need for multiple valves, electronic controllers and actuators, reduces the amount of tubing required and significantly reduces the weight and cost of the system while increasing the reliability of the system by reducing possible leakage points in the system and reducing the complexity of the system. Moreover, the operation of the valve as a supply tank closure further reduces the weight and increases the reliability of the system.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A valve assembly for transferring fluid from a fluid supply tank having an aperture formed therein, to a fluid holding tank, the valve assembly comprising:

a housing having a first port for communication with the fluid supply tank and a second port for communication with the fluid holding tank;

a drum rotatably mounted in the housing having at least one passageway formed therein, said passageway having an opening located at each end thereof positioned on an outer surface of the drum for alignment with one of said first and second ports in the housing;

the drum being rotatable between a flow position in which said openings are aligned with said first and second ports to permit fluid to flow from the fluid supply tank to the fluid holding tank and a shut-off position in which one of said openings is not aligned with said first and second ports to prevent flow from the supply tank to the fluid holding tank; and an actuator for rotating the drum within the housing between the flow and shut-off positions;

the housing being sealingly engageable with the fluid supply tank around a periphery of the aperture in the tank for sealingly closing the aperture in the tank;

the housing comprising opposing end walls, a side wall connecting the end walls and a flange extending radially outward from the side wall for engagement with the fluid supply tank around the Periphery of the aperture in the tank;

a third port in the housing for communication with a fluid receiving device and a second passageway in the drum having an opening located at one end thereof for alignment with said second port and an opening at the other end thereof for alignment with said third port.

2. A valve assembly as set forth in claim 1 wherein said first and second ports are located on the opposing end walls of the housing and said third port is located on the side wall of the housing.

3. A valve assembly as set forth in claim 1 wherein the actuator comprises a linear actuator located within the fluid supply tank.

4. A valve assembly as set forth in claim 1 wherein the drum is cylindrical.

5. A valve assembly as set forth in claim 1 wherein the drum is part spherical.

6. A fuel transfer system comprising a fuel supply tank, a fuel holding tank, an engine, and a valve assembly for controlling fluid communication between the fuel supply tank and the fuel holding tank, and between the fuel holding tank and the engine, the valve assembly comprising:

a housing having a first port in communication with the fuel supply tank, a second port in communication with the fuel holding tank and a third port in communication with the engine;

a drum rotatably mounted in the housing and including a first passageway having a first opening at one end thereof adapted to mate with said first port in the housing, and a second opening at the other end thereof adapted to mate with said second port in the housing, and a second passageway extending from said second opening to a third opening adapted to mate with said third port in the housing, the drum being rotatable about a longitudinal axis for selective alignment of said openings with said ports according to the relative angular position of the drum; and an actuator for rotating the drum within the housing to specific angular positions;

the drum being rotatable between a filling position in which said first port is aligned with said first opening and said second port is aligned with said second opening for transferring fluid from the fuel supply tank to the fuel holding tank, and a fuel delivery position in which said second opening is aligned with said second port and said third opening is aligned with said third port for transferring fluid from the fuel holding tank to the engine.

7. A fuel transfer system as set forth in claim 6 further comprising a vent line for venting fuel from the fuel holding tank and a pressure line for pressurizing fuel in the fuel holding tank, and wherein the housing comprises a fourth port adapted to communicate with the vent line and a fifth port adapted to communicate with the pressure line.

8. A fuel transfer system as set forth in claim 7 wherein the housing comprises opposing end walls and a side wall connecting the end walls, said first and second ports being located the end walls, said third, fourth and fifth ports being located on the side wall of the housing.

9. A fuel transfer system as set forth in claim 8, further comprising a shaft connected to the drum and extending through one of the end walls of the housing, and wherein the actuator is mounted on said one end wall of the housing for rotatably driving the shaft.

10. A fuel transfer system as set forth in claim 6 further comprising a ratchet and pawl assembly for positively positioning the drum at one of the specific angular positions relative to the housing.

11. A fuel transfer system as set forth in claim 6 wherein the housing is sealingly engageable with the fuel supply tank around a periphery of an aperture in the fuel supply tank.

12. A fuel transfer system as set forth in claim 6 wherein the drum of the valve assembly is generally cylindrical.

13. A fuel transfer system as set forth in claim 6 wherein the valve assembly is part spherical.

14. A method of transferring fuel from a fuel supply tank to an engine through a valve assembly comprising a housing having at least two ports formed therein, a drum rotatably mounted in the housing and having at least one passageway formed therein, said passageway having an opening located at each end thereof positioned on an outer surface of the drum for alignment with at least one of said ports in the housing, the drum being rotatable about a longitudinal axis for selective alignment of said openings with said ports according to the relative angular position of the drum, and an actuator for rotating the drum within the housing to specific angular positions, the method comprising the steps of:

rotating the drum to a filling position wherein the fuel supply tank is in fluid communication with a fuel holding tank to permit flow from the fuel supply tank to the fuel holding tank;

rotating the drum to a delivery position wherein the fuel holding tank is in fluid communication with the engine to permit flow from the fuel holding tank to the engine;

rotating the drum to a venting position wherein the fuel holding tank is in fluid communication with a vent to relieve pressure from the fuel holding tank before rotating the drum to its said filling position; and rotating the drum to a pressurizing position wherein the holding tank is in fluid communication with a pressure source to pressurize the fuel in the holding tank prior to rotating the drum to its said delivery position.

15. A method of transferring fuel as set forth in claim 14 further comprising the step of rotating the drum to a shut-off position in between the venting position and the filling position, the filling position and the pressurizing position, and the pressurizing position and the delivery position.

16. A method of transferring fuel as set forth in claim 15 wherein the drum is rotated by providing fluid power to the actuator to rotate the drum.

17. A method of transferring fuel as set forth in claim 15 wherein the drum is rotated by providing electrical power to the actuator to rotate the drum.

18. A valve assembly for transferring fluid from a fluid supply tank having an aperture formed therein, to a fluid holding tank, the valve assembly comprising:

a housing having a first port for communication with the fluid supply tank and a second port for communication with the fluid holding tank;

a drum rotatably mounted in the housing having at least one passageway formed therein, said passageway having an opening located at each end thereof positioned on an outer surface of the drum for alignment with one of said first and second ports in the housing;

the drum being rotatable between a flow position in which said openings are aligned with said first and second ports to permit fluid to flow from the fluid supply tank to the fluid holding tank and a shut-off position in which one of said openings is not aligned with said first and second ports to prevent flow from the supply tank to the fluid holding tank; and an actuator for rotating the drum within the housing between the flow and shut-off positions, the actuator comprising a linear actuator located within the fluid supply tank;

the housing being sealingly engageable with the fluid supply tank around a periphery of the aperture in the tank for sealingly closing the aperture in the tank.

19. A valve assembly for transferring fluid from a fluid supply tank having an aperture formed therein, to a fluid holding tank, the valve assembly comprising:

a housing having a first port for communication with the fluid supply tank and a second port for communication with the fluid holding tank;

a part spherical drum rotatably mounted in the housing having at least one passageway formed therein, said passageway having an opening located at each end thereof positioned on an outer surface of the drum for alignment with one of said first and second ports in the housing; the drum being rotatable between a flow position in which said openings are aligned with said first and second ports to permit fluid to flow from the fluid supply tank to the fluid holding tank and a shut-off position in which one of said openings is not aligned with said first and second ports to prevent flow from the supply tank to the fluid holding tank; and an actuator for rotating the drum within the housing between the flow and shut-off positions;

the housing being sealingly engageable with the fluid supply tank around a periphery of the aperture in the tank for sealingly closing the aperture in the tank.

* * * * *